United States Patent [19]

Shaw et al.

[11] 3,753,337
[45] Aug. 21, 1973

[54] GAS CLEANING SYSTEM

[76] Inventors: Harry D. Shaw, 445 W. Perry St., Tiffin, Ohio 44883; George E. Strausbaugh, 2444 County Rd. 80, Burgoon, Ohio 43407

[22] Filed: June 18, 1971

[21] Appl. No.: 154,293

[52] U.S. Cl. .................. 55/233, 55/258, 55/315, 55/331, 55/463, 261/98, 261/118
[51] Int. Cl. ............................................. B01d 47/06
[58] Field of Search .................... 55/233, 257–259, 55/331, 336, 337, 463, 238, 315–316; 261/97, 98, 103, 106, 115, 118

[56] References Cited
UNITED STATES PATENTS

| | | | |
|---|---|---|---|
| 679,678 | 7/1901 | King | 55/463 X |
| 701,898 | 6/1902 | Larson | 261/115 X |
| 825,796 | 7/1906 | Bartlett et al. | 55/463 X |
| 1,040,499 | 10/1912 | Braemer | 55/258 X |
| 1,745,297 | 1/1930 | Harry | 261/111 UX |
| 1,809,646 | 6/1931 | Sperr | 261/97 |
| 2,265,227 | 12/1941 | Coffey | 261/111 |
| 2,615,699 | 10/1952 | Dixon | 261/101 |
| 3,100,693 | 8/1963 | Klein et al. | 55/233 UX |
| 3,505,788 | 4/1970 | Teller et al. | 55/233 |
| 3,664,094 | 5/1972 | Barkovitz | 55/233 X |

FOREIGN PATENTS OR APPLICATIONS 569,536   10/1922   France ................. 261/98

Primary Examiner—Frank W. Lutter
Assistant Examiner—Vincent Gifford
Attorney—Wilson and Fraser

[57] ABSTRACT

A system for cleaning gas and particularly for removing fine solid particles including a cyclone separator and a unit separator downstream thereof interconnected by a duct containing sources of oppositely directed liquid curtains or sprays through which the gas stream passes. A wire maze filter is positioned in the duct downstream of the curtains in a position to be washed by the second curtain. A second separator receives the issue from the duct and provides a broad area reentrant gas path to an exit and a surface upon which fluid and removed solids accumulates and flows under the influence of gravity to a sump and/or exit.

1 Claim, 3 Drawing Figures

PATENTED AUG 21 1973
3,753,337
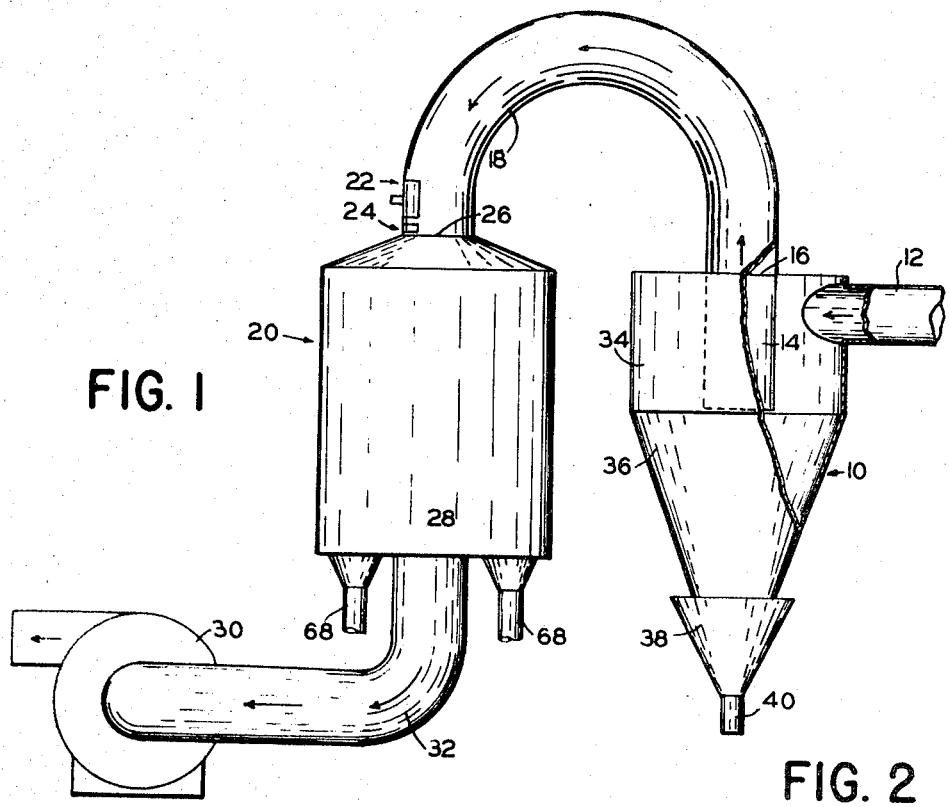
FIG. 1
FIG. 2
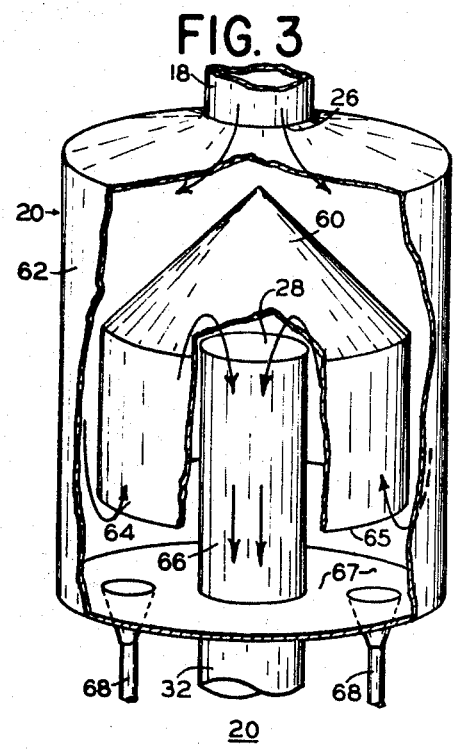
FIG. 3
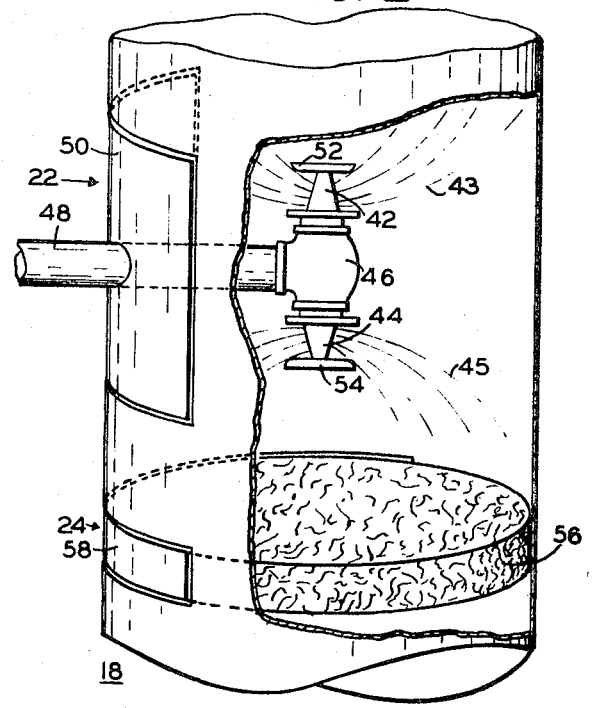
INVENTORS
HARRY D. SHAW
GEORGE E. STRAUSBAUGH
BY
Wilson + Fraser

GAS CLEANING SYSTEM

BACKGROUND OF THE INVENTION

Heretofore gas cleaning systems have been known wherein a gas with entrained foreign matter is first passed through a cyclone separator to remove the heavier materials and thereafter directed through further cleansing stages. These subsequent stages have included liquid curtains or sprays and mechanical filters such as screens, webs and grids. The processes have sought to wet and collect the particles in these stages.

Carryover of undesired foreign matter in the gas exhausted from the cleaning systems is not uncommon. This carryover has been attributed to inadequate wetting of the particles and the failure to precipitate the particles from the gas stream whether they have been wetted or not. In some systems the gas with entrained wetted particles is directed by vanes or grid bars through abrupt changes in direction of flow for the purpose of causing impingement of the wet particles on the vanes or bars. Such processes have also met with only limited success.

SUMMARY OF THE INVENTION

The present system relates to apparatus for cleaning gaseous medium of particles and, more particularly to a system for cleaning air of pulverized particles suspended therein such as foundry or flue dust. The system comprises, in one embodiment, a circular duct having a 180° circular turn interconnecting a cyclone separator and unit separator to form the system with the air being pulled therethrough from an inlet on the cyclone separator to an exit on the unit separator by a squirrel cage blower connected to the exit of the unit separator. A set of oppositely directed spray nozzles, having nozzle tips capable of imparting an umbrella flow pattern to the spray discharge counter to the gas flow followed by such a pattern in the direction of gas flow, are located within the above duct immediately upstream of the unit separator inlet. Inbetween the inlet and the nozzles, is a filter of a mass of fine wire such as stainless steel wool. One spray nozzle is directed counter to the flow of the stream approaching it, while the other spray nozzle is directed opposite the first nozzle or parallel to the flow resulting in a wetting or general saturation of the filter and a washing of the wetted particles impinging on the filter onto a diffuser which collects the particles or residue collected on the filter and deflects the gaseous medium, now free of particles, to the exit.

The counter directed spray curtains in the gas stream coupled with the liquid saturated fine wire filter thoroughly wet all particles in the stream. As the gas stream exits the filter downward, the liquid is carried therefrom by the parallel forces of the gas flow and gravity into a unit separator having an enlarged cross section path where the gas velocity is reduced and its flow directed radially outward permits the liquid and wetted solids, particularly where they have mixed and coalesced in the filter to form relatively large and heavy particles, to fall across the gas flow to an accumulating surface including a skirted region on which it flows and coalesces into larger particles under gravity and gas flow influences. The gas is again carried across the flow of droplets of mixed solid and liquid falling from the lower lip of the skirt and is exhausted from the unit separator through a port within the skirt. The mixed solids and liquid accumulate in a sump and can be withdrawn therefrom to conventional manner.

The system is one capable of returning fresh air to the environment and salvaging both large and small particles where such are re-useable material. Light particles are removed by the system with greater efficiency than devices of the prior art as a result of the mixing of particles and water within the water spray and filter units.

The absence of moving parts, except the blower, makes the system generally maintenance free.

BRIEF DESCRIPTION OF THE DRAWINGS

FIG. 1 is an elevational view of the gas cleaning system with a portion of the cyclone cut-away to reveal the inlet and outlet connections thereto;

FIG. 2 is an enlarged perspective fragmentary view of the inlet duct to the separator with a portion of the duct cut-away to reveal the components therein; and FIG. 3 is an enlarged perspective view of the separator for the gas cleaning system with a portion of both the outer shell and the diffusion cone, and its skirt cut-away for illustrative purposes.

DESCRIPTION OF THE PREFERRED EMBODIMENT

The major components of the system illustrated in FIG. 1 are a cyclone separator 10 with an inlet 12 tangentially connected thereto into which gas with particles, and more particularly in this embodiment solids such as foundry and flue dust and dirt enters, as revealed by the cut-away portion of the cyclone 10. An outlet extension 14 of the cyclone outlet 16 has a port at its lower end through which the gas passes from the cyclone 10 after the particles of a large mass have been removed. Upon leaving the cyclone 10, the gas enters the duct 18 which connects the cyclone to the unit separator 20 and which contains the liquid spray 22 and filter 24 units immediately upstream of the entry 26 to the unit separator 20. A combination of wetting of the remaining particles, impingement of the particles upon the filter, and a washing of the filter cleans the gas of all apparent particles. The clean gas then is directed by the unit separator 20 to the exit 28 thereof to be discharged out of the squirrel cage blower 30 connected thereto by pipe 32.

While the preferred embodiment is discussed with respect to air, clearly any gaseous medium containing particles could be cleaned by the above system. Further, where particles of a large mass are not present, the cyclone could be eliminated and the free end of the duct 18 could be the inlet for the system.

The cyclone separator 10 is known in the prior art and operates on the principle that the air entering the inlet 12 tangent to the cylindrical body 34 of the cyclone 10 develops a circular motion forcing the particles outward while the air leaves the cyclone through the outlet extension 14 at the center thereof. Conical sections 36 and 38 direct the particles removed to a common collector 40, and increase the speed of rotation of the air forced downward to enter the outlet extension 14 to in turn increase the centrifugal force on the particles in the air to further encourage separation.

Upon leaving the cyclone 10, the air passes, with the remaining particles suspended therein, into the duct 18 which is of circular cross section and is formed in a 180° semi-circular turn, in the preferred embodiment, to be directed into the entry 26 of the unit separator 20.

Other duct configurations other than circular could be used. The 180° turn adds turbulence to the air stream just prior to encountering the water spray 22 to increase contact between the particles in the stream and the water being sprayed. Further inducement for wetting of particles comes from the sizing of the duct 18 in comparison to the cyclone inlet 12. The duct 18 is maintained larger in cross section than the inlet 12 to reduce the stream velocity within the duct and as a result the velocity of the particles to give more time for wetting thereof.

Upstream of the entry 26, in the straight run portion of the duct 18, are located the water spray unit 22 and filter unit 24. FIG. 2 illustrates the water spray 22 and filter units in detail. Two spray nozzles 42 and 44 are tied to a common connection 46, such as a tee, having a water pipe 48 also connected thereto and to a source of water (not shown). The water pipe passes through a quick access cover 50 and is sealed reasonably tight therewith to prevent leakage. Similarly, the cover 50 is sealed to the duct 18 and covers an aperture therein through which the water spray unit 22 may be removed. The spray nozzles 42 and 44 have tips 52 and 54 respectively which impart an umbrella flow pattern 43 and 45 to the water discharged therefrom over the entire air stream cross-section. Generally, the flow is radially outward from the nozzles 42 and 44 and oblique to the gas flow, for example as a cone having about a 60° angle to its vertical axis through the nozzle. It is entirely feasible that liquids other than water could be used in other embodiments as well as other flow patterns which cover the stream cross-section. Where a soluble material is picked up as with a water wash of the bond for molding sand in a foundry, it can be concentrated by recirculating the wash water through the washer and then reclaimed.

Spray pattern 43 from nozzle 42 is directed into, or counter to, the gas flow in duct 18 while spray pattern 45 from nozzle 44 is directed parallel or with the gas flow. As a result, the spray 43 from nozzle 42 presents greater resistance to stream flow to give a higher particle wetting efficiency than nozzle 44 which, while adding to the particle wetting efficiency, also tends to saturate the filter 56 immediately downstream of the nozzle 44. The water flows generally uniformly over the major face of the filter 56 opposing the nozzle 44, and through the filter which is preferrably comprised of a gathered mass of fine strands which may be fine wires or ribbons randomly arrayed to form a maze through which the liquid and gas pass. The material of the strands advantageously is not subject to progressive corrosion by the materials to which it is exposed, and is impervious to the liquids and gases. One suitable filter medium is stainless steel wire similar to steel wool. Particles in the turbulent gas flowing through the entangled wire impinge on the strands and the impinged particles or residue are subsequently washed through the filter 56 by liquid principly directly applied from nozzle 44. Further, the action of the water passing through the filter 56 simultaneously with the air stream results in turbulence within the filter 56 to further aid in wetting of the particles and their impingement on the filter 56.

The filter 56 is retained within the duct 18 by convenient means not illustrated such as a ring flange on the internal diameter of the duct 18 or a series of clips therefor which are methods known in the art. Access to the filter is through a quick access door 58 which like the water spray cover 50 is sealed to the duct 18 and covers an aperture therein through which the filter 56 can be removed.

As pointed out above, the residue collected on the filter 56 is washed therethrough by the water spray 22.

Directly beneath the filter, located within the unit separator 20, is a splitter cone or diffuser 60 for collecting the residue. The diffuser 60 is a cone shaped deflector as best illustrated in the cut-away view of the unit separator 20 in FIG. 3. It will be noted that the round body 62 of the unit separator 20 matches the roundness of the duct 18 of the illustrated embodiment to give an even distribution of the air flow. In continuing the roundness concept, the diffuser 60 is also designed with roundness to achieve uniform distribution of air flow over the surface thereof. An apron or skirt 64 depends from the diffuser to force the air stream downward and then upward to be discharged through the exit extension 66.

The combination of slowing down the cleaned air leaving the filter 56 by virtue of the large increase in cross-section of the flow path between duct 18 and unit separator plus the 180° turn required for the air to pass the skirt 64 reduces the energy of the air stream to abate reentrainment of residue falling from the filter 56 onto the diffuser 60 and down the skirt 64 to fall across the path of the air stream and come to rest in the bottom of the unit separator 20 along with the water from the water spray 22. As the residue and water accumulate, they find their way into the residue collectors 68 to be transferred to a waste disposal or a reclamation process.

Operation of the system takes advantage of gravitational forces in that the spray unit 22, filter unit 24 and unit separator are vertically aligned. Gas enters the spray unit with some turbulence due to the short radius turn around which it flows immediately preceding that section of the duct. Thereafter the opposed liquid curtains further mix the gas flow to wet entrained particles. The gas flow and gravity carry the gas-liquid-particle mixture through the mechanical filtering maze of the fine liquid impervious elements of the filter mass where wet particles impinge on the elements or strands and are washed therefrom by the liquid droplets which fall and are sprayed directly upon it to cause relatively large droplets to fall toward diffuser 60. The conical form of the diffuser directs the gas radially from the vertical axis of the spray unit 22 - filter unit 24 - unit separator 20 combination, as represented by the arrows depicting gas flow in FIG. 3, while collecting the droplets of liquid, particles of wet solid and suspensions and/or slurries of the liquid-particle mix. The gas stream around the diffuser tends to urge the liquid-solid mix accumulated thereon downward from the apex of the cone to skirt 64 and down skirt 64 to its lip or lower extreme 65. From lip 65, the mix falls as a semi-fluid masses into sump 67 and thence to drains 68. The gas flows around lip 65 and up the interior of skirt 64 to the exit port 28 in the end of exit duct 66 and 32 without reentraining the liquid or solid masses since its velocity at the point it encounters the free falling masses is insufficient to cause any pick up.

The above system, as illustrated in the preferred embodiment, is one which returns fresh air to the environment while salvaging material in the heavier forms in a collector where the material is re-useable. The combination of a double head water spray, filter and unit separator with residue collector accommodates the salvaging of lighter particles. The lighter particles are removed by the system with greater efficiency than devices of the prior art as a result of the intimate mixing of particles and water within the water spray and filter units.

There are virtually no moving parts within the unit other than the blower which handles clean air, and the process of particle separation is self-sustaining and continuous, making the system generally maintenance free.

We claim:

1. A gas cleaning system for removing solid particles in a gas having a dirty gas inlet, a clean gas outlet, and means for impelling the gas to be treated from the inlet to the outlet comprising: a cyclone separator communicating with said dirty gas inlet for removing relatively heavy solid particles from the gas being treated; a duct forming a short radius turn of 180° in a vertical plane having one end communicating with the outlet of said cyclone separator for inducing turbulence in the gas flowing therethrough; a first means disposed within the other end of said duct for developing a curtain spray of liquid in an umbrella flow pattern across said duct and directed obliquely counter to the flow of gas therein; a second means developing a curtain spray of liquid in an umbrella flow pattern across said duct and directed obliquely parallel with the flow of gas therein downstream of said first means; a maze of fine stainless steel wire elements which are essentially inert and impervious to the liquid and gas-particle compositions and are randomly disposed in a mass extending across said duct immediately downstream of and below said second means; and a means for collecting the liquid-solid particle residue mixture formed by said system from the gas flow downstream and below said maze, said collecting means comprising a chamber providing an enlarged cross-sectional path for gas flow from said duct; a diffuser directly below said maze and within said chamber having an apex vertically aligned with said maze and downwardly sloping faces extending outwardly from the apex to beyond the vertical projection of said maze; a skirt depending from the outer extremities of said faces; a sump below and spaced from said skirt for reception of the liquid-solid particle residue mixture; and a duct beneath said diffuser and having a port within said skirt for exhausting gas from said collecting means chamber.

* * * * *